United States Patent
Yune et al.

(10) Patent No.: US 12,508,286 B2
(45) Date of Patent: Dec. 30, 2025

(54) COMPOSITION FOR TREATING SPINAL CORD INJURY, COMPRISING STEM CELLS TREATED WITH NOVEL COMPOUND

(71) Applicant: YJ CERAPEUTICS INC., Seoul (KR)

(72) Inventors: Tae Young Yune, Seoul (KR); Hea Young Park, Yongin-si (KR); Jee Youn Lee, Seoul (KR); Sang Ryong Jeon, Seoul (KR); Bong Gun Ju, Goyang-si (KR)

(73) Assignee: YJ CERAPEUTICS INC., Seoul (KR)

( * ) Notice: Subject to any disclaimer, the term of this patent is extended or adjusted under 35 U.S.C. 154(b) by 880 days.

(21) Appl. No.: 17/777,359

(22) PCT Filed: Nov. 18, 2019

(86) PCT No.: PCT/KR2019/015785
§ 371 (c)(1),
(2) Date: May 17, 2022

(87) PCT Pub. No.: WO2021/100889
PCT Pub. Date: May 27, 2021

(65) Prior Publication Data
US 2022/0401492 A1  Dec. 22, 2022

(51) Int. Cl.
*A61K 35/30* (2015.01)
*A61P 25/00* (2006.01)
*C12N 5/0797* (2010.01)

(52) U.S. Cl.
CPC .............. *A61K 35/30* (2013.01); *A61P 25/00* (2018.01); *C12N 5/0623* (2013.01); *C12N 2501/999* (2013.01); *C12N 2506/1346* (2013.01)

(58) Field of Classification Search
CPC ....... A61K 35/30; A61P 25/00; C12N 5/0623; C12N 2501/999
See application file for complete search history.

(56) References Cited

U.S. PATENT DOCUMENTS

2018/0177829 A1   6/2018   Kim et al.

FOREIGN PATENT DOCUMENTS

| KR | 10-1666727 B1 | 10/2016 |
| KR | 10-2018-0072644 A | 6/2018 |
| KR | 10-2019-0041897 A | 4/2019 |
| WO | 2004/046122 A2 | 6/2004 |
| WO | 2004/063177 A1 | 7/2004 |

OTHER PUBLICATIONS

Lee et al. (Stem Cell Res. Aug. 2018:31:71-78. doi: 10.1016/j.scr.2018.07.006. Epub Jul. 19, 2018. (Year: 2018).*
Andrea J. Mothe, et al., "Review of transplantation of neural stem/progenitor cells for spinal cord injury", Int. J. Devl Neuroscience, 2013, vol. 31, pp. 701-713 (13 pages total).
Sreenivasa Raghavan Sankavaram, et al., "Adult Neural Progenitor Cells Transplanted into Spinal Cord Injury Differentiate into Oligodendrocytes, Enhance Myelination, and Contribute to Recovery", Stem Cell Reports, May 14, 2019, vol. 12, pp. 950-966 (17 pages total).
International Search Report for PCT/KR2019/015785 dated, Aug. 14, 2020 (PCT/ISA/210).

* cited by examiner

*Primary Examiner* — Fereydoun G Sajjadi
*Assistant Examiner* — Joel D Levin
(74) *Attorney, Agent, or Firm* — Sughrue Mion, PLLC

(57) ABSTRACT

The present invention relates to a composition for treating a spinal cord injury and provides a composition for treating a spinal cord injury comprising, as an active ingredient, stem cells treated with a particular compound and then cultured.

4 Claims, 5 Drawing Sheets

- Nestin (type VI intermediate filament (IF) protein, Neural Stem Cell Marker)
- GFAP (Glial fibrillar acidic protein, Astrocyte marker)
- Tuj1 - Neuron-specific class III β-tubulin, Neural Progenitor Marker

COMPOSITION FOR TREATING SPINAL CORD INJURY, COMPRISING STEM CELLS TREATED WITH NOVEL COMPOUND

CROSS REFERENCE TO RELATED APPLICATIONS

This application is a National Stage of International Application No. PCT/KR2019/015785 filed Nov. 18, 2019.

TECHNICAL FIELD

The present invention relates to a composition for treating spinal cord injury including stem cells treated and cultured with a novel compound as an active ingredient.

BACKGROUND ART

Injuries to the vertebrae due to trauma, etc. cause damage to the spinal cord and eventually paralysis of human body functions. Although the anatomical structure of the spinal cord is more simple than the brain, regeneration capacity after spinal cord injury is very low.

Pathological phenomena of post-spinal cord injury are divided into primary and secondary injuries depending on phase.

Primary damage occurs within minutes of injury and cell necrosis occurs mainly at the wound site. At this time, cells are destroyed quickly, so that it is almost impossible to treat the injury by pharmacological treatment.

Secondary injury following the primary injury progresses slowly over several hours to several days, resulting in apoptosis of neurons and oligodendrocytes in the penumbra lesion. Apoptosis proceeds continuously centered on the wounded site, and eventually, the damaged area inside the spinal cord gradually expands.

In addition, the axon, which is a passageway of the nerve signal, and myelin that helps the function of the axon are degenerated to eventually form a cystic cavity in the injured spinal cord, and further nerve signal transmission cannot be made, resulting in permanent loss of function.

For a long time, research has been conducted to suppress or alleviate permanent functional paralysis due to spinal cord injury through researchs on the cause and regeneration of pathologies that occur after spinal nerve trauma.

Since the initial mechanism of spinal cord injury progresses so rapidly that it is difficult to treat it with pharmacological treatment, it is important to develop a therapeutic agent with a pharmacological strategy to deal with the secondary mechanism.

To date, various potential pharmacological treatments such as steroids, antioxidants, glutamate receptor inhibitors, ion channel inhibitors, gangliosides, antibodies to axon regeneration inhibitors, anti-inflammatory agents, and neurotrophic factors have been tried.

However, only methylprednisolone has been used as the therapeutic agent for post-spinal cord injury, and nevertheless, it has many problems, such as unclear therapeutic effects and side effects due to overdose.

Therefore, treatment of spinal cord injury using drugs or physiotherapy has reached its limit, and thus many experimental studies focusing on treatment by cell transplantation are in progress.

Stem cells have the ability to differentiate throughout the life of an organism for indefinite periods, and treatment methods using them have been studied, but the method has not been established so far.

Transplantation of stem cells with differentiating ability into the injured area after spinal cord injury can be used as a therapeutic strategy to replace permanently lost nerve cells and provide new nerve cells to the injured area, thereby promoting nerve regeneration.

The present inventors have confirmed that the therapeutic effect of spinal cord injury can be significantly improved through the transplantation with stem cell treated with a specific compound and intended to provide a reference point that can accelerate rapid clinical application in the future.

DISCLOSURE

Technical Problem

An object of the present invention is to provide a stem cell-based therapeutic agent for spinal cord injury in order to address the issues of the prior art.

Technical Solution

According to one aspect of the present invention, there is provided a composition for treating spinal cord injury, the composition including stem cells treated with the compound of Formula 1 below as an active ingredient.

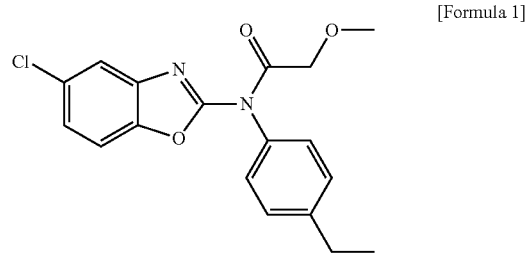 [SMILES: CCc1ccc(N(C(=O)COC)c2nc3cc(Cl)ccc3o2)cc1]

[Formula 1]

In one embodiment, the spinal cord injury may be caused by trauma or inflammation.

In one embodiment, the inflammation may be caused by one or more selected from the group consisting of acute transverse myelitis, acute disseminated myelitis, myelopathy, non-Hodgkin's lymphoma, hydrocephalus, hereditary ataxia, neurosyphilis, Minamata disease, Lou Gehrig's disease, and multiple sclerosis.

In one embodiment, the stem cells may be mesenchymal stem cells.

In one embodiment, the stem cells may be cultured for 96 hours to 144 hours after treating with the compound.

In one embodiment, the stein cells may be differentiated into migrating neuroblasts.

According to another aspect of the present invention, there is provided a method of producing stem cells for treating spinal cord injury, the method including steps of: (a) treating the stem cells with a compound of Formula 1 below; and (b) culturing the stem cells treated with the compound for 96 hours to 144 hours.

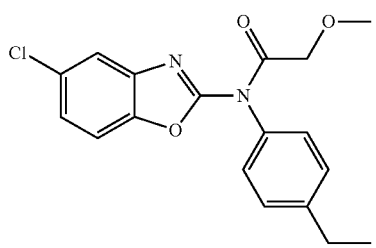

[Formula 1]

According to still another aspect of the present invention, there is provided a method of treating spinal cord injury, the method including a step of administering the composition for treating spinal cord injury.

Advantageous Effects

According to the present invention, the composition for treating spinal cord injury uses stem cells differentiated at a certain stage so that the nerve cell regeneration effect is significantly superior to that of a conventional stem cell-based therapeutic agent.

It should be understood that the effects of the present invention are not limited to the above-described effects and include all effects that can be inferred from the configuration of the invention described in the detailed description or claims of the present invention.

MODES OF THE INVENTION

Figure 1:
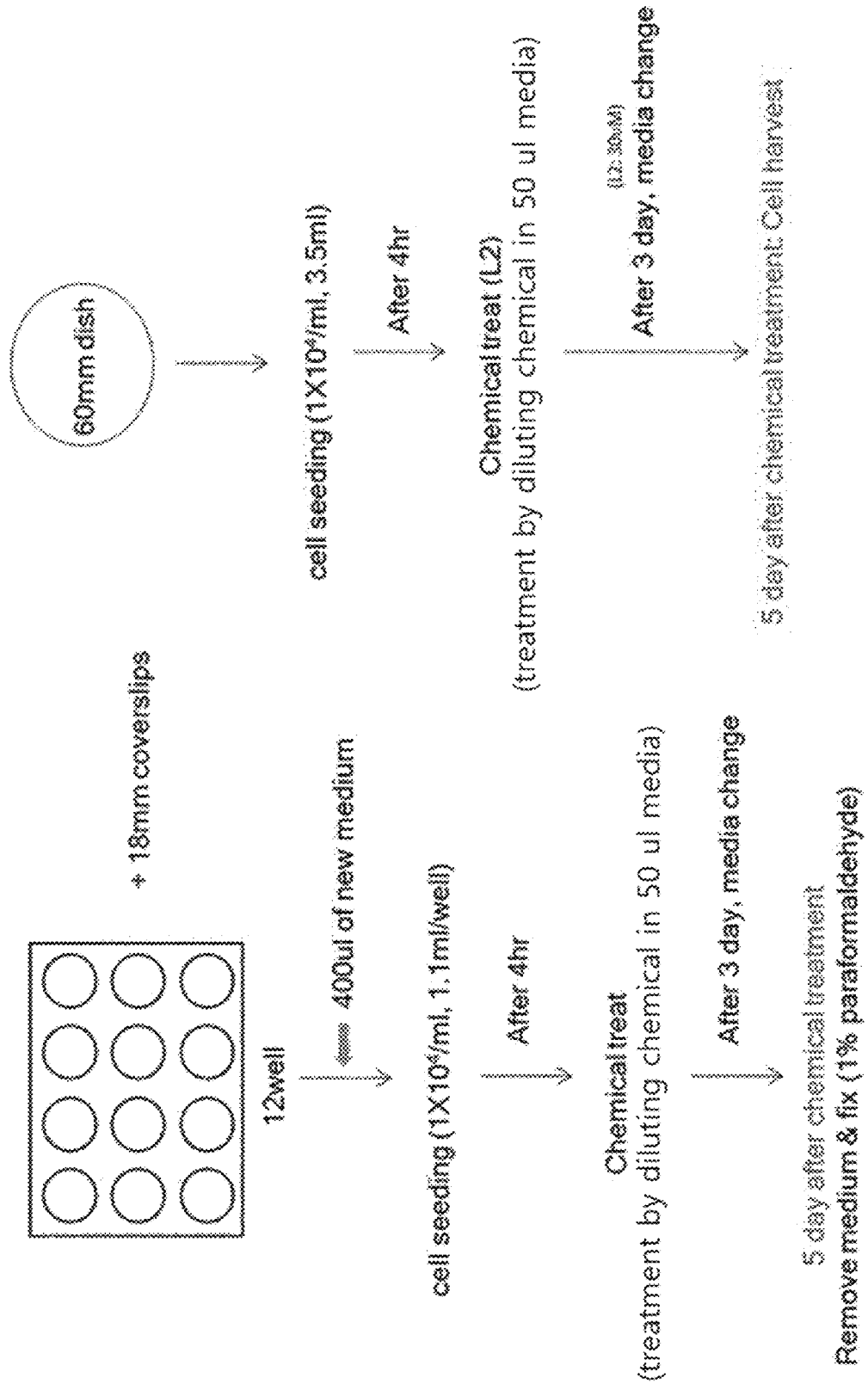
FIG. 1 schematically illustrates a method for culturing stem cells according to an embodiment of the present invention.

Hereinafter, the present invention is described with reference to the accompanying drawings. However, the present invention may be embodied in several different forms and thus is not limited to the embodiments described herein. When a part "includes" a certain component, it means that other components may be further included, rather than excluding other components, unless otherwise stated.

Unless otherwise defined, molecular biology, microbiology, protein purification, protein engineering, and DNA sequencing may be performed by conventional techniques commonly used in the art of recombinant DNA within the abilities of those skilled in the art. Such techniques are known to those skilled in the art and are described in many standardized textbooks and reference books.

Various scientific dictionaries including terms contained herein are well known and available in the art. Although any methods and materials similar or equivalent to those described herein are found to be used in the practice or testing herein, several methods and materials are described. The present invention is not limited to specific methods, protocols, and reagents since various uses may be made depending on the context used by those skilled in the art.

As used herein, the singular includes plural objects unless otherwise stated. Further, unless otherwise stated, nucleic acids are described from left to right, or 5' to 3', respectively, and amino acid sequences are described from left to right, or amino to carboxyl, respectively. Hereinafter, the present invention will be described in more detail.

According to one aspect of the present invention, there is provided a composition for treating spinal cord injury, the composition including stem cells treated with the compound of Formula 1 below as an active ingredient.

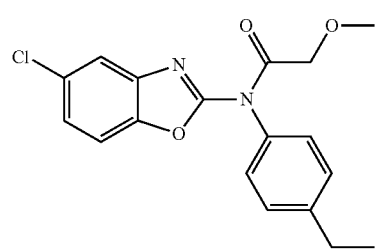

[Formula 1]

The name of the compound is N-(5-Chlorobenzo[d]oxazol-2-yl)-N-(4-ethylphenyl)-2-methoxyacetamide, and may be prepared by chemical synthesis.

The present inventors confirmed that the compound-treated stem cells are injected into the spinal cord to effectively improve the spinal cord injury.

The compound may be used in the form of a pharmaceutically acceptable salt, and an acid addition salt formed by a pharmaceutically acceptable free acid may be useful as the salt.

The compound may form a pharmaceutically acceptable acid addition salt according to a method conventional in the art.

The free acid may be an organic acid or an inorganic acid. For example, the inorganic acid may be hydrochloric acid, bromic acid, sulfuric acid, or phosphoric acid, and the organic acid is citric acid, acetic acid, lactic acid, tartaric acid, maleic acid, fumaric acid, formic acid, propionic acid, oxalic acid, trifluoroacetic acid, benzoic acid, gluconic acid, methane sulfonic acid, glycolic acid, succinic acid, 4-toluene sulfonic acid, benzenesulfonic acid, salicylic acid, nicotinic acid, isonicotinic acid, picolinic acid, glutamic acid, or aspartic acid, but is not limited thereto.

The term "spine cord injury (SCI)" refers to a clinical condition in which the parenchymal tissue of the spinal cord is damaged by various factors, such as physical shock, and it shows paralysis of peripheral motor muscles, sensory and autonomic nervous system at the lower side of the injured site.

The spinal cord injury may be caused by trauma or inflammation, and may be, for example, traumatic spinal cord injuries such as a traffic accident, sports, or industrial accident, or non-traumatic spinal cord injuries such as inflammation, bleeding, tumor, or spinal deformity.

The inflammation may be caused by one or more selected from the group consisting of acute transverse myelitis, acute disseminated myelitis, myelopathy, non-Hodgkin's lymphoma, hydrocephalus, hereditary ataxia, neurosyphilis, Minamata disease, Lou Gehrig's disease, and multiple sclerosis, but it is not particularly limited as long as it can cause spinal cord injury by inducing inflammation.

The term "treatment" means to alleviate symptoms of spinal cord injury or to stop the progression of symptoms and may encompass the meaning of commonly used treatment.

The stem cells may be mesenchymal stein cells or mesenchymal stem cells derived from human umbilical cord blood stem cells.

The term "stem cell" is a cell capable of differentiating into various cells by the characteristic of multipotency when an appropriate signal is given under the influence of the environment in which the cell is located as well as self-replicating ability.

The stem cells are included in fat, bone marrow, umbilical cord blood, and placenta and can be used to treat various cell damaging diseases such as spinal cord injury, myocardial infarction, cerebral infarction, degenerative arthritis, and fractures. The stem cells may be autologous or allogeneic stem cells and may be derived from any type of animal, including humans and non-human mammals.

The term "mesenchymal stem cell" is a cell that originated from stroma, has the characteristic of self-renewal, and can differentiate into bone, cartilage, adipose tissue, muscle, tendon, ligament, nerve tissue, etc., which can be utilized in cell therapy.

The mesenchymal stem cells can be obtained from the bone marrow, but they have a problem in which the mesenchymal stem cells present in the bone marrow have a limited range of applications due to their limited differentiation and proliferative abilities, and it is necessary to find a donor that does not show a graft-versus-host response by matching antigen phenotype through histocompatibility antigen comparison for bone marrow transplant.

Meanwhile, the umbilical cord can be obtained through a simple procedure during childbirth, and since it contains numerous hematopoietic stem cells and stem cells, a large number of stem cells can be isolated from the umbilical cord, placenta, umbilical cord blood, and the like.

The method for isolating the mesenchymal stem cells is well known in the art. For example, the mesenchymal stem cells may be isolated and purified from human cord, Wharton's jelly, umbilical cord blood, placenta, fat, bone marrow, tonsils, human embryonic yolk sac, umbilical cord, skin, peripheral blood, muscle, liver, nerve tissue, periosteum, fetus membrane, synovial membrane, synovial fluid, amnion, meniscus, anterior cruciate ligament, articular chondrocytes, baby teeth, perivascular cells, arachnoid bone, infrapatellar fat pad, spleen and thymus, and the like.

The stem cells may be obtained through (a) treating the stem cells with the compound; and (b) culturing the stem cells treated with the compound for 96 hours to 144 hours, and the stem cells may differentiate into migrating neuroblasts.

Figure 3:
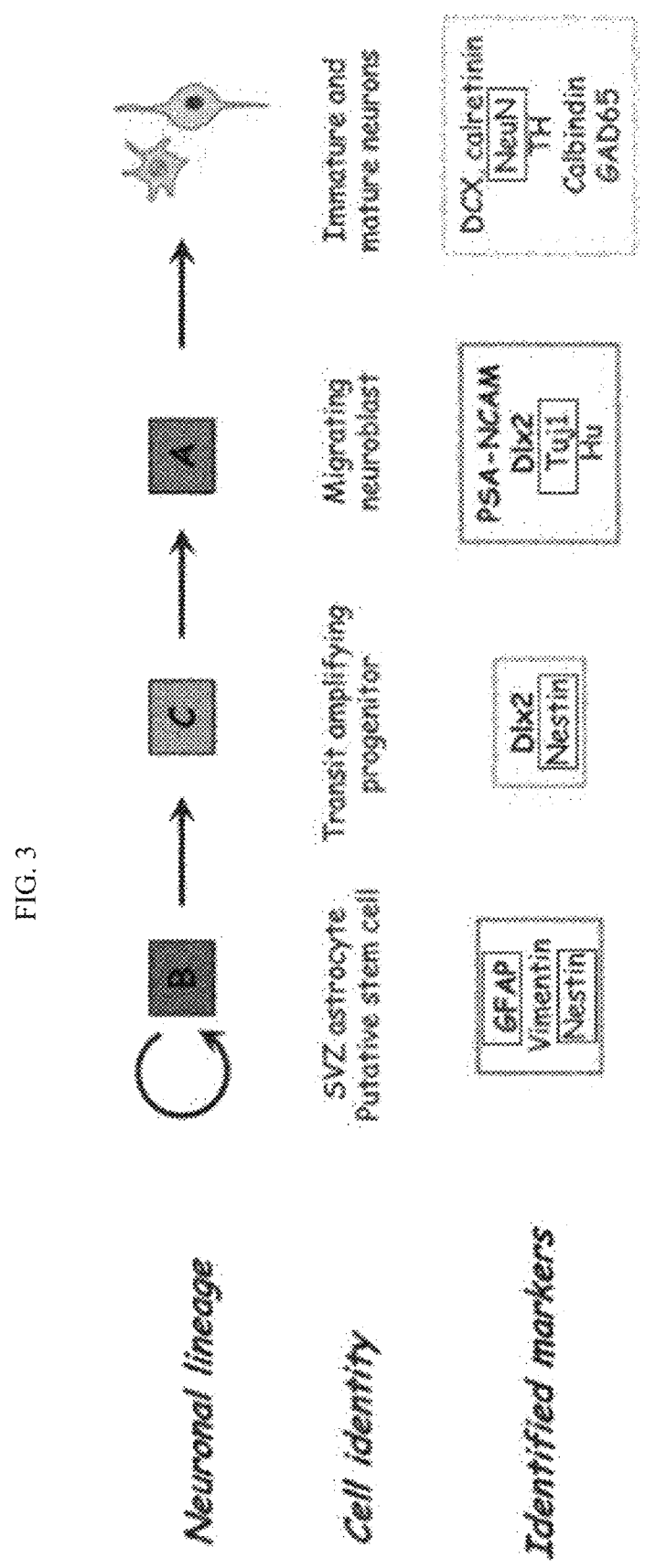
FIG. 3 illustrates neuronal lineage markers according to stem cell differentiation.
Figure 4:
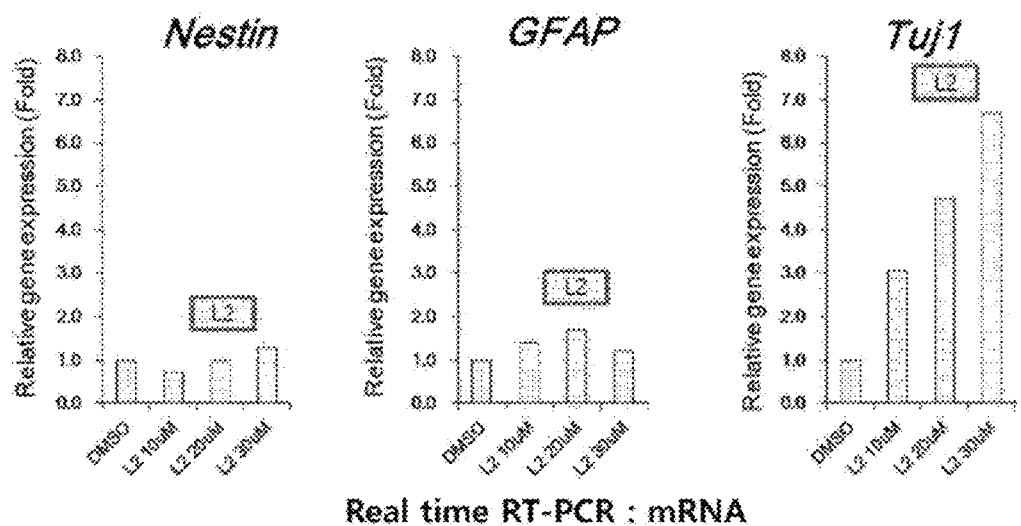
FIG. 4 illustrates the differentiation stage of stem cells using the neuronal lineage marker.
Figure 4:
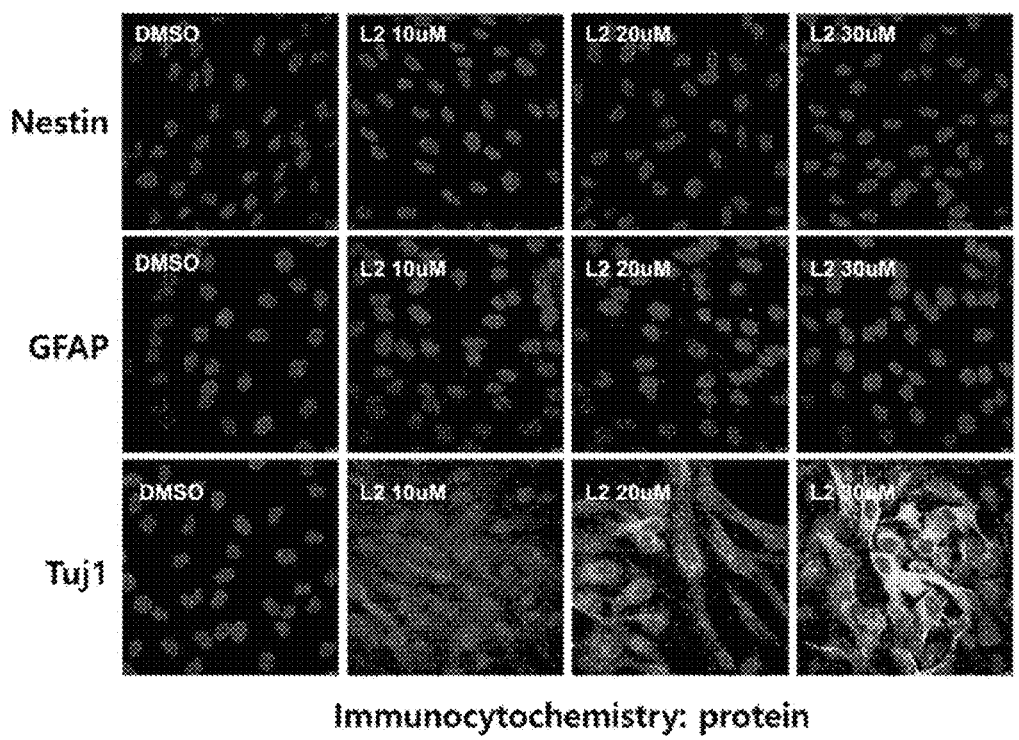

Referring to FIGS. 3 and 4, MSCs were cultured in a medium containing the compound for 5 days, and the differentiation status was confirmed using a neural lineage marker. As a result. Nestin and GFAP were hardly expressed, and about 90% or more of the cells were confirmed as Tuj1-positive cells.

That is, after 96 hours to 144 hours of culture after treatment with the compound, the stem cells may differentiate into migrating neuroblasts, and spinal cord injury may be effectively alleviated by introducing the differentiated cells into the living body.

The mesenchymal stem cells may be injected into the living body alone or in a cultured state in an incubator, for example, the clinical method of Lindvall (1989, Arch. Neurol. 46: 615-31) or Douglas Kondziolka (Pittsburgh, 1998) may be used.

The composition for treating spinal cord injury may include a conventional pharmaceutically acceptable carrier other than mesenchymal stem cells. An injection may include preservatives, analgesic agents, solubilizers, or stabilizers, and a topical formulation may include bases, excipients, lubricants, preservatives, or the like.

The preferred dosage of the composition for treating spinal cord injury of the present invention varies depending on the condition, body weight, degree of disease, drug form, administration route, and period, but is appropriately selected by those skilled in the art to which the present invention belongs. Preferably, the therapeutic composition of the present invention may be administered $10^7$ to $10^{10}$ cells/time, preferably $10^5$ to $10^9$ cells/time, and most preferably $10^6$ cells/time based on the number of mesenchymal stem cells. The composition may be administered once a day or divided into several times. The dosage and frequency of administration are not intended to limit the scope of the present invention in any way.

Through the following examples, the present invention will be described in more detail, but it is obvious that the present invention is not limited by the following examples.

Experimental Method

Compound Preparation $AlCl_3$ (0.73 mmol, 2 eq) was added to S-chloro-N-(4-ethylphenyl)benzo[d]oxazol-2-amine (0.37 mmol, 1 eq) dissolved in 10 mL of dichloromethane under nitrogen, and then the mixture was stirred at room temperature (15° C. to 30° C.) for 10 minutes.

Methoxymethylcarbonyl chloride (0.73 mmol, 2 eq) was added thereto in an ice bath, and the mixture was stirred at room temperature (15° C. to 30° C.) for 5 hours.

10 mL of distilled water was added thereto, and the extraction was performed three times with 10 mL of EtOAc. The organic layer was separated, washed twice with 10% aqueous HCl solution (10 mL), twice with saturated aqueous NaCl solution (10 ml), and dried over $MgSO_4$, and then the solvent was concentrated under reduced pressure.

The residue was washed with n-hexane:EtOAc:ether=5: 2:1 (v/v/v) to obtain the compound of Formula 1.

White powder (28%), mp 121.6-123° C.; $^1$H NMR (Acetone-$d_6$, 400 MHz) δ 7.653 (d, J=6.0 Hz, 1H), 7.533 (d, J=8.8 Hz, 1H), 7.357 (m, 4H), 4.611 (s, 2H), 3.367 (s, 3H), 2.728 (q, J=7.6 Hz, 2H), 1.271 (t, J=7.6 Hz, 3H). HR-FABMS Calcd for $C_{18}H_{18}ClN_2O_3$ ($M^++H$): 345.1006, Found: 345.1004.

In the following experiments, this compound was referred to as L2.

Manufacture of Spinal Cord Injury Animal Model

After anesthesia by intraperitoneal injection of chloral hydrate (500 mg/kg) to adult male Sprague Dawley rats (Samtaco, Korea), the 8th to 10th thoracic vertebrae were exposed.

An animal model of spinal cord trauma was performed using an NYU impactor (Routes, Cytec Korea) designed to give a trauma similar to a human spinal cord injury by dropping a 10 g weight at a certain height and quantifying the trauma intensity on a computer.

After confirming that a certain amount of injury was applied within a specified error range through the data on the injury intensity identified on the computer, the wound area was sutured.

After sterilizing the wounded area with Povidin solution, two animals were put and bred in cages, and the bladder was artificially massaged three times a day to promote urination.

Cell Culture

MSCs of passage 3 received from Kangstem Biotech were maintained in a KSB3 basal medium containing 10% FBS (Gibco) and supplements.

After passage 1, MSCs of passage 4 were stocked and stored in liquid nitrogen.

Stem Cell Differentiation

Referring to FIG. 1, MSCs of passage 5 were seeded at 1 mL per well in 12 wells diluted to $1.1 \times 10^4$/mL.

After 4 hours, the cells were treated with 40 μM of L1 or L3 or 30 μM of L2 (Formula 1).

After three days, the medium was changed with a new medium, and the cells were treated with the compound in the same manner and then additionally cultured for two days.

Transplantation of Stem Cells into Spinal Cord

Figure 2:
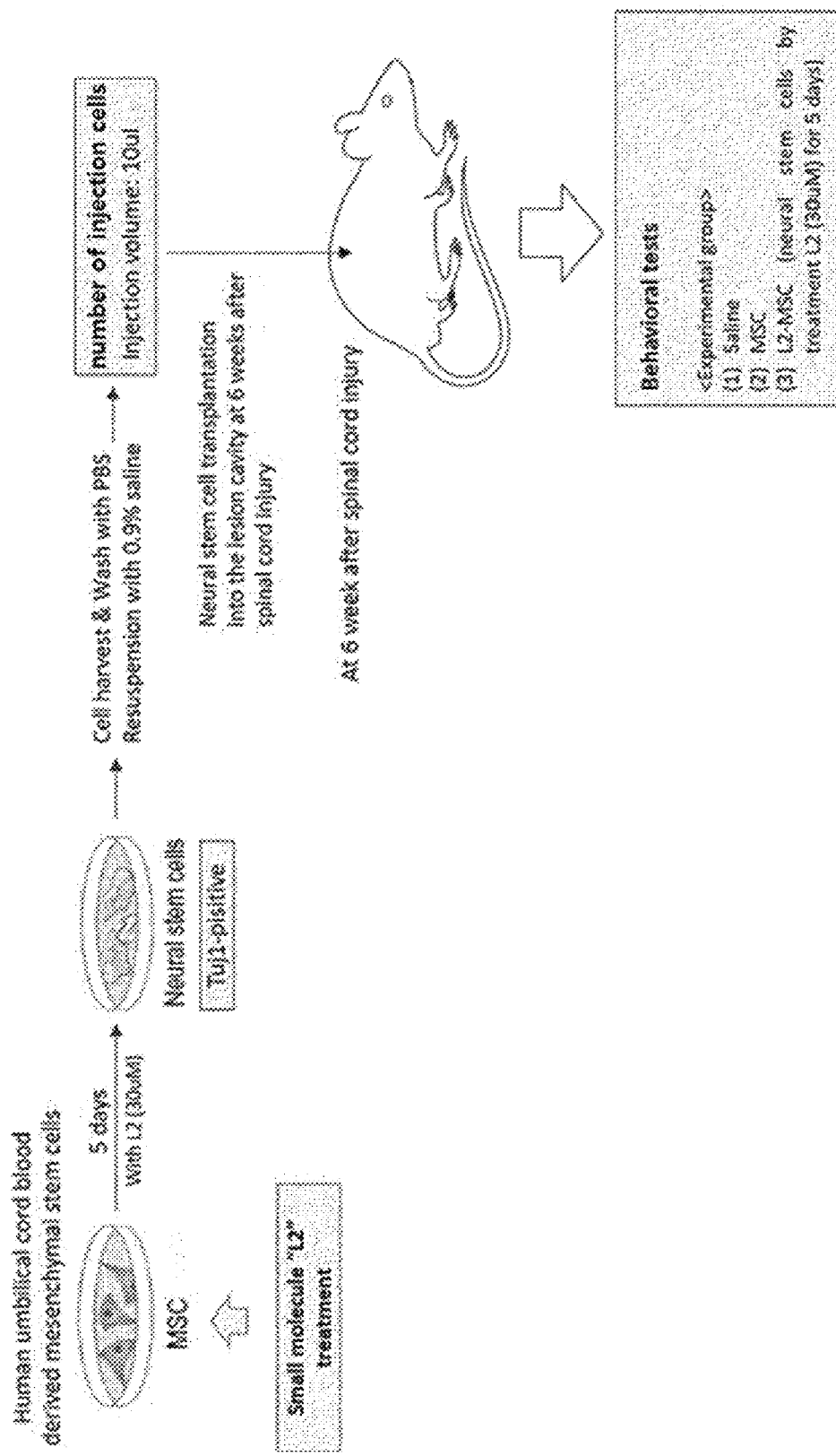
FIG. 2 schematically illustrates a motor function recovery evaluation experiment using stem cells according to an embodiment of the present invention.

Referring to FIG. 2, 6 weeks after inducing spinal cord injury, rats were randomly selected and divided into the following three groups.

(1) Control group 1 (saline group): Injection of only saline to the lesion site instead of stem cells (2) Control group 2 (MSC group): Transplantation of only undifferentiated mesenchymal stem cells (3) Experimental group (MSC+L2 group): Transplantation of Tuj1-positive neural stem cells differentiated by L2, low molecular weight compound.

After anesthesia by intraperitoneal injection of chloral hydrate (500 mg/kg) to rats with spinal cord injury, the surgical site was incised, and 10 μL of samples were injected into the lesion epicenter using a glass pipette. The number of transplanted cells in the experimental group injected with stem cells was $1 \times 10^6$.

Experiment Result

Behavioral Evaluation

The following three behavioral evaluations were performed eight weeks after transplantation (once a week).

(1) BBB locomotor score: A method of scoring 0 to 21 points for hind paw motor function in an open field in which 0 points is no movement, and 21 points is normal (2) Grid walk test: A method of calculating the number of times the paw falls out as a percentage when a rat is made for walking on the ladder (3) Footprint analysis: A method of analyzing the pattern of the soles imprinted on the floor by applying ink to the soles of the rats (front paws: red, hind paws: blue) and walking a long box.

BBB Open Field Score

The BBB test is an experimental method that can be used to evaluate the recovery of various nerve bundles that control motor function.

The score is divided from 0 to 21. When the hind paw cannot be used at all, 0 points are given, and in the case of normal rats, 21 points are given, indicating that the higher the score, the better the motor function.

The rats were placed in an open field box (width 90 cm×length 90 cm×height 7 cm) once a day for 4 minutes per rat before 3 days of traumatic spinal cord injury and allowed to roam freely in the box to acclimatize in advance.

From one day after the spinal cord trauma, three trained experimenters observed each rat's hind paw movement once a week and scored the BBB score, and the average value of the three BBB scores was determined as the final BBB score of the rat.

In order to exclude individual prejudice against animal experiments, the test subjects were not allowed to know information about the rats, and each rat was observed for 4 minutes to calculate a score.

As a result of observation, immediately after receiving the spinal cord trauma, it was observed that all rats did not move at all on their hind paws, and they dragged the lower body by relying on their front paws.

Spontaneous recovery occurred one week after spinal cord trauma, and after four weeks, a plateau state in which motor function recovery did not appear any longer was maintained, so it was determined that a chronic spinal cord injury model was established.

Six weeks after spinal cord injury, saline, undifferentiated MSC, and differentiated MSC with L2 (for 5 days) were transplanted, and from the first week of transplantation, the group transplanted with MSC or L2-treated MSC started to show a higher BBB score than the group transplanted with only saline. Up to 8 weeks after transplantation, the BBB score of the MSC or L2-treated MSC group remained higher than that of the saline group.

As a result of checking the BBB score 14 weeks after the spinal cord injury (8 weeks after transplantation), the BBB score of the saline rat (control group 1) was about 9. It was confirmed that it supported its weight only when standing still, and it was restored to the degree of stepping using the back of the foot continuously when walking.

Figure 5:
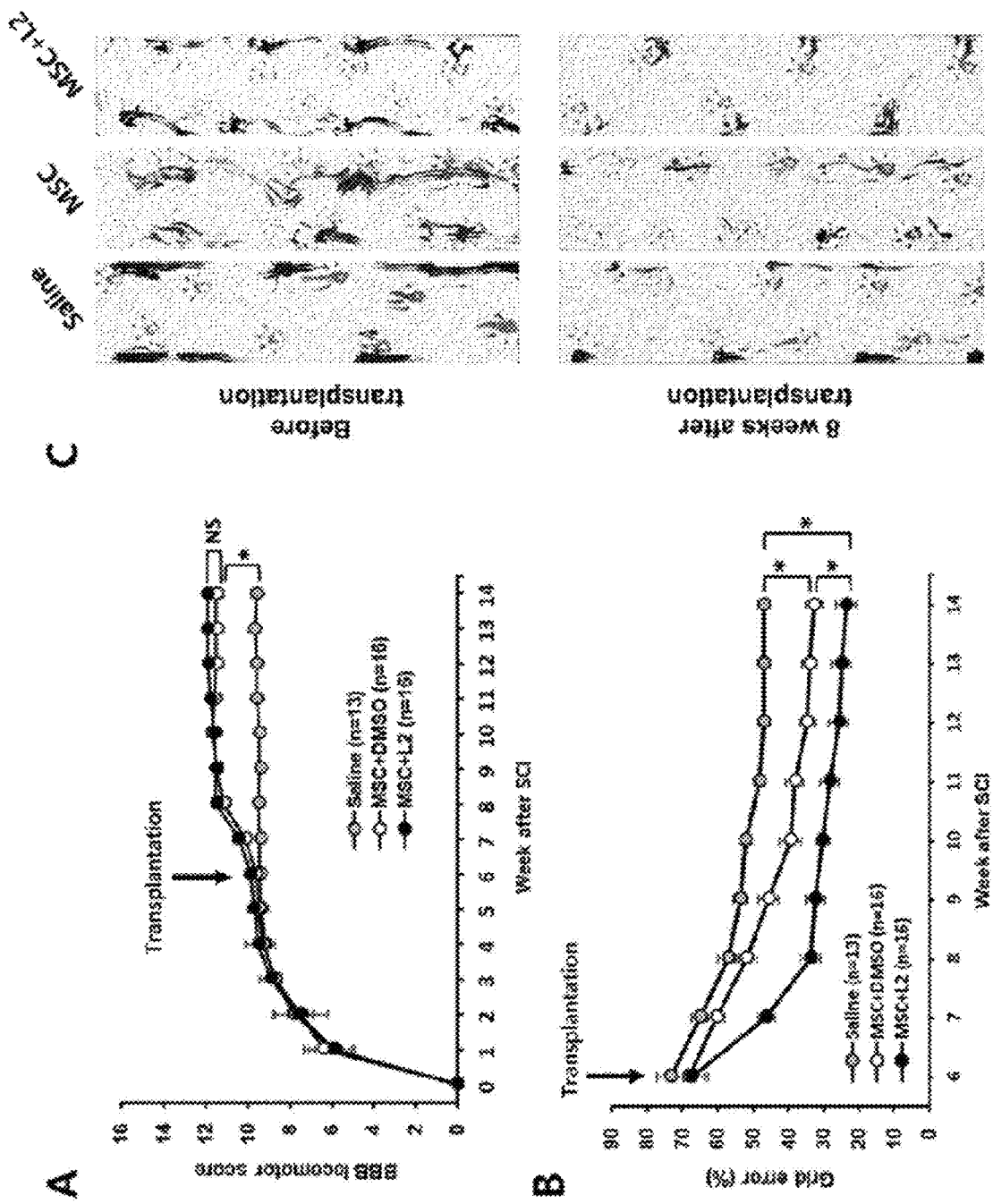
FIG. 5 illustrates a behavioral evaluation result for an animal as an experimental subject.

Meanwhile, the BBB score of rats administered with MSCs (control group 2) or L2-treated MSCs (experimental group) was about 12. It walked with its body weight supported and showed a recovery degree in which the front and hind paws crossed about 50% of the time while walking. Thus, a significant motor function recovery effect was confirmed compared with control group 1 (FIG. 5A).

In the case of transplantation of MSCs and L2-treated MSCs, the BBB score of L2-treated MSC transplantation was slightly increased compared to that of MSC transplantation, but there was no significant difference.

Grid Walk Test

The ability to intersect rhythmically with the front paw and hind paw and the ability to step accurately with the hind paw were evaluated.

A rat was passed through a 1 m long metal grid plate, and the frequency with which the paw fell under the grid was expressed as a percentage (%).

From 3 days before the start of the test, each rat was allowed to pass through a 1-meter metal grid three times a day to adapt to the experimental environment, and the first test was performed right before transplantation at six weeks after spinal cord trauma.

While the rat was passed through the metal grid plate, stopping in the middle was not counted, and only the cases where the rat passed voluntarily without resting were counted. The rat was passed through the grid three times.

The rat movements were recorded with a video camera, and the experimental results were analyzed by two experimenters who did not know which group each rat belonged to.

As a result of the experiment, the ratio of the number of steps with the hind paw under the grid to the total number of steps taken by the rat was expressed as a percentage (%), and the average values of each group were compared.

Referring to FIG. 5B, before transplantation, error rates of all three groups of rats were about 70%.

At one week after transplantation, the error rates of the control group 2 and the experimental group were lower than those of the control group 1.

In particular, the experimental group showed a rapid decrease in the error rate within 1 to 2 weeks of transplantation compared to the control group 2 and showed the lowest error rate for eight weeks after transplantation.

These results suggest that among the three groups, the rat transplanted with L2-treated MSCs stepped on its hind paw more accurately and had improved walking ability.

Footprint Analysis

Footprint analysis was performed as a criterion to evaluate the degree of recovery of hind paw motor function in rats after spinal cord trauma.

Red ink was applied to the front paws of the rat, and blue ink was applied to the hind paws. The footprints were observed by passing them through a narrow passage (in the length of 1 m and width of 7 cm) covered with white paper.

If the rat did not pass the passage within S seconds or stopped in the middle, it was excluded from the analysis, and the test was performed eight times per animal.

Harmony and spacing with the front paw, degree of hind paw rotation, stride length between hind paws, the distance between paws, and toe drag were used as indicators to measure hind paw function.

They were passed through the passage three times a day from three days before the start of the test to adapt to the experimental environment.

Referring to FIG. 5C, in general, after spinal nerve trauma, the rat's hind paws were paralyzed and a trajectory of dragging the hind paws appeared.

At six weeks after the injury, the legs of the rats of all groups did not support the body when walking, so the footprints of the hind paws (blue) were not taken and continuous dragging of the paws was observed.

At eight weeks after transplantation, control group 2 had improved recovery. There was some dragging of the toes, but it recovered enough to be able to walk on the soles of the feet, and thus, the footprints of the hind paw were left on the paper. In addition, the phenomenon of short dragging behind the footprints of the hind paw was observed due to the dragging of the toes.

There was almost no drag on the foot print of the experimental group (L2-treated MSC transplant), and the gap between the fore and hind paws narrowed, indicating improved limb coordination.

The description of the present invention described above is for illustration, and those of ordinary skill in the art to which the present invention pertains can understand that it can be easily modified into other specific forms without changing the technical spirit or essential features of the present invention. Therefore, it should be understood that the embodiments described above are illustrative in all respects and not restrictive. For example, each component described as a single type may be implemented in a distributed form, and likewise, components described as distributed may also be implemented in a combined form.

It should be construed that the scope of the present invention is indicated by the following claims, and all changes or modifications derived from the meaning and scope of the claims and their equivalents are included in the scope of the present invention.

The invention claimed is:

1. A method of producing stem cells for treating spinal cord injury, the method comprising steps of:
   (a) treating the stem cells with a compound of Formula 1 below; and
   (b) culturing the stem cells treated with the compound for 96 hours to 144 hours

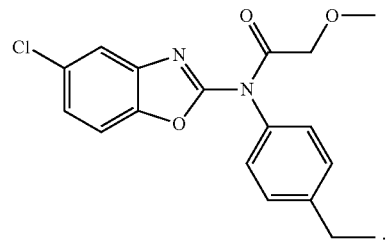

[Formula 1]

2. A method of treating spinal cord injury, the method comprising
   (a) treating stem cells with a compound of Formula 1 below; and
   (b) culturing the stem cells treated with the compound for 96 hours to 144 hours

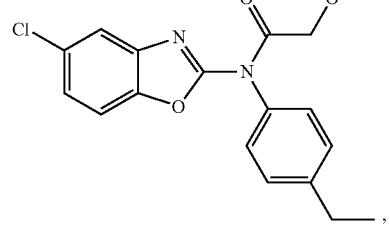

[Formula 1]

administering the stem cells obtained from step (b) to a subject in need thereof.

3. The method of claim 2, wherein the spinal cord injury is caused by trauma or inflammation, and
   wherein the inflammation includes one or more selected from the group consisting of acute transverse myelitis, acute disseminated myelitis, myelopathy, non-Hodgkin's lymphoma, hydrocephalus, hereditary ataxia, neurosyphilis, Minamata disease, Lou Gehrig's disease, and multiple sclerosis.

4. The method of claim 2, wherein the composition includes $10^4$ to $10^{10}$ cells of stem cells for treating spinal cord injury.

* * * * *